(12) United States Patent
Lewis

(10) Patent No.: US 7,460,621 B2
(45) Date of Patent: Dec. 2, 2008

(54) DETECTION

(75) Inventor: Michael Lewis, Märsta (SE)

(73) Assignee: Infineon Technologies AG, Munich (DE)

( * ) Notice: Subject to any disclaimer, the term of this patent is extended or adjusted under 35 U.S.C. 154(b) by 757 days.

(21) Appl. No.: 10/875,437

(22) Filed: Jun. 24, 2004

(65) Prior Publication Data

US 2004/0264607 A1  Dec. 30, 2004

(30) Foreign Application Priority Data

Jun. 24, 2003  (SE) .................................. 0301823

(51) Int. Cl.
*H03D 1/00* (2006.01)
(52) U.S. Cl. .................. 375/343; 375/142; 375/260
(58) Field of Classification Search .............. 375/267, 375/343, 142, 150, 260
See application file for complete search history.

(56) References Cited

U.S. PATENT DOCUMENTS

| 4,621,365 A | 11/1986 | Chiu | 375/1 |
| 6,154,486 A * | 11/2000 | Scott et al. | 375/142 |
| 6,909,760 B2 * | 6/2005 | Borowski et al. | 375/367 |
| 6,925,110 B2 * | 8/2005 | Jard et al. | 375/152 |
| 7,072,384 B2 * | 7/2006 | Tanaka | 375/149 |
| 2003/0060167 A1 * | 3/2003 | Bonhomme | 455/67.6 |
| 2003/0161411 A1 * | 8/2003 | McCorkle et al. | 375/295 |
| 2004/0004934 A1 * | 1/2004 | Zhu et al. | 370/208 |

FOREIGN PATENT DOCUMENTS

| EP | 0 851 602 A2 | 12/1997 |
| WO | WO 01/28146 | 4/2001 |

* cited by examiner

*Primary Examiner*—David C Payne
*Assistant Examiner*—Rahel Guarino
(74) *Attorney, Agent, or Firm*—Coats & Bennett, P.L.L.C.

(57) ABSTRACT

In a method and apparatus for detecting a message in a signal the message begins with a preamble consisting of a fixed sequence of symbols, each having a symbol time T, modulated by repetitions of a higher rate code having low autocorrelation at lags anything other than zero. The repetitive code and the fixed sequence of symbols is known at the detector. The method comprises correlating the signal with the repetitive code; autocorrelating the signal with a copy of the signal, which is delayed substantially a symbol time; correlating the signal with the preamble; and indicating the detection of a message if a value in the signal is greater than a threshold value.

16 Claims, 6 Drawing Sheets

DETECTION

PRIORITY

This application claims priority to Swedish application no. 0301823-1 filed Jun. 24, 2003.

TECHNICAL FIELD OF THE INVENTION

The present invention relates to an apparatus for improved detection of low-autocorrelation sequence modulated signals and a method therefore. More specifically the present invention relates to receiver equipment, where transmissions begin with a preamble consisting of a fixed sequence modulated by a higher rate repetitive "spreading code", such code chosen to have low autocorrelation at lags anything other than zero. An example system is an 802.11 b wireless LAN receiver, which uses a Barker code of length 11 to modulate each symbol of a 1Msymbols/s PSK sequence.

BACKGROUND OF THE INVENTION

An important task in the reception of a digital signal is to detect when the beginning of a transmission arrives at the receiver in the presence of noise and channel distortion. This is particularly important in a random access communications system i.e. a system where transmission times are not known in advance, such as wireless LANs based on the IEEE 802.11 standard. The primary task in designing the detection process of such a system is to give a high probability of detecting an arriving signal within a specified time from the signal start, while giving a low probability of false alarms, indication of a signal when no signal is present, with noise or interfering signals.

An important class of communication systems are so-called "direct sequence spread spectrum" systems, where a transmitted sequence is scrambled by a "spreading code", a higher rate sequence which causes the transmitted signal to occupy a wider bandwidth and thereby be more robust against frequency-selective fading, such as can be caused by multi-path interference.

A subclass of such signals is used in the IEEE 802.11 and IEEE 802.11b standards. These standards define the use of a length 11 Barker sequence, defined as +1, −1, +1, +1, −1, +1, +1, +1, −1, −1, −1, where the left-most value, or "chip" is output first. This code is used to multiply the transmitted signal at a rate 11 times faster than the transmitted signal; for the case of the preamble in IEEE 802.11 DSSS/IEEE 802.11b, the transmitted signal during the preamble consists of one of two known pseudo-random sequences modulated using differential BPSK, i.e. the output carrier wave is multiplied either by +1 or −1.

In a practical design, the sampling rate at the transmitter and receiver is often a multiple of the chip rate, e.g. 22 MHz, in which case each chip value is output twice. For simplicity, and without loss of generality, the following discussion only deals with a sampling rate that is the same as the chip rate.

From the receiver's viewpoint, one of the main benefits of the Barker code is that it has a very low autocorrelation of either −1 or 0 except for lag zero, when the output is 11. In this context, the autocorrelation of a sampled signal x(n) with lag τ is defined as:

$$Rxx(\tau) = \sum_n x(n) \cdot x^*(n-\tau)$$

The property of low autocorrelation means that, at the receiver, the incoming signal can be correlated with the Barker sequence used at the transmitter. Signals modulated with the Barker sequence will therefore produce a strong peak at the output of the correlator, but other signals will not produce strong peaks.

During transmission of a single Barker sequence beginning at time m over an additive white gaussian channel, noise is added, leading to a received complex signal given by:

$$y(n) = A\exp(i\phi)x(n-m) + e(n)$$

i.e. the received samples are scaled, phase-rotated versions of the original plus white gaussian noise.

When the Barker sequence is superimposed on a chain of BPSK symbols, we can use the linear nature of the autocorrelation to determine that the result will be the sum of the responses to each individual pulse. This will therefore produce a sequence of pulses at the end of each transmitted BPSK symbol, with the sign of the pulse depending on the sign of the transmitted symbol.

In a practical system, there are other degradations than simple Gaussian noise. One important source of degradation is frequency offset between the transmitting and receiving devices. In the 802.11b standard, this can be up to 25 ppm at each device, leading to a total possible mismatch of 50 ppm or 120 kHz. This causes the phase shift in the received signal to vary with time, and causes the Barker correlator result to have a changing phase and slightly reduced output signal amplitude. However, this amplitude reduction is small, e.g. −0.2 dB, at a frequency offset of 120 kHz.

Objects between a radio transmitter and receiver, which are reflective to radio energy, provide a range of different paths between transmitter and receiver other than the direct path, which may even not exist in some situations. Each of these paths has a different delay, and attenuates the signal by a different amount. The result at the receiver is that each received sample is the sum of a number of differently delayed copies of the signal with different phases and amplitudes, plus noise:

$$y(n) = \sum_m A_m \exp(i\phi_m) x(n-m) + e(n)$$

Again, superposition may be used to determine the correlator response. Each multipath ray m produces a distinct peak of amplitude $11A_m$ surrounded by ripples with amplitude $A_m$. This means that the correlator output can be used effectively to separate each multipath ray, since the ripples from adjacent multipaths are small in comparison.

The signal energy available at the receiver is spread out across all of the different multipaths. This means that, for a given signal energy, the peak correlator output is lower typically a "hump" rather than a sharp peak as in the case of non-dispersive channels.

The most straightforward solution to the Barker preamble detect problem is to base the detection decision on the difference between the Barker correlator output in the presence or absence of a Barker-modulated input signal. The mean output signal, per-symbol peak, in the presence of a Barker preamble is given by:

$$c(n)_{bar\,ker} = 11A\exp(i\phi) + \sum_{k=0}^{10} e(n-k)$$

In the absence of a signal the correlator output signal is given by:

$$c(n)_{noise} = \sum_{k=0}^{10} e(n-k)$$

The main difficulty in this process is the unknown phase and amplitude of a given symbol. By taking the square value of the magnitude of the correlator output at a given instant, the phase component can be eliminated. The result is given by:

$$c(n)c^*(n) = \left(11A\exp(i\phi) + \sum_{k=0}^{10} e(n-k)\right)\left(11A\exp(-i\phi) + \sum_{k=0}^{10} e^*(n-k)\right)$$

$$= 121A^2 + 22A\text{Re}\left(\sum_{k=0}^{10} e(n-k)\right) + \sum_{k=0}^{10} e(n-k)e^*(n-k)$$

It can be seen that this expression consists of three main components: a constant component proportional to the signal power, a component proportional to the noise power, and a cross-product which has zero mean but whose variance is proportional to the signal level and noise level. In the absence of a signal, the result is proportional to the noise power.

If this result is summed across S symbols, according to:

$$d(n) = \sum_{s=0}^{S} c(n-11s) \cdot c^*(n-11s)$$

the variance of the result is reduced, leading to a lower probability for false alarm.

The result of this summation is still proportional to the amplitude of the received signal. One approach to setting a decision threshold in the presence of this variable amplitude is to measure the mean amplitude of the input signal, and use it to normalize the detection threshold.

The main weakness of the Barker correlation magnitude based solution is that the detection decision is based on the difference between the noise level and the signal plus noise level. When the signal to noise ratio is low, the difference between the expected outputs with and without a signal is low and the variance of the result is high, which leads to poor detector performance. In addition, this method does not resolve multipath.

The previous method was based only on the power of the Barker correlation output averaged over a number of symbols. However, for an 802.11b preamble, the signal is also BPSK modulated by one of two possible sequences. This additional information can be used to improve the gain of the detector. Instead of correlating on a symbol-by-symbol basis, the received signal can be correlated against the entire known transmitted sequence, and the magnitude of the result used for the decision. The result is given by:

$$d(n) = \sum_{s=0}^{S} b(s)c(n-11s)$$

where b(s) is the BPSK signal value at each symbol s. This signal has a variance that is reduced according to the length of the summation, but in contrast to the previous design, the mean output in the presence of pure noise is zero. Since there are two possible sequences in IEEE 802.11b, two results must be calculated with the corresponding values of b(s), and the maximum chosen. This increases the false alarm probability.

The second method has, at first sight, a much better performance since the expected output in the absence of signal is zero. Indeed, this architecture is well known to be the mathematically optimum detector in the case of a pure white Gaussian channel. However, the presence of an unknown frequency offset means that the output of the receiver loses phase alignment with the transmitted BPSK sequence within a few symbols, preventing this method from being used. Even without a frequency offset, this method offers no resolution of multipath components.

SUMMARY OF THE INVENTION

It is a main object of the present invention to provide such apparatus and method that at least alleviate the above problems.

It is in this respect a particular object of the invention to provide such apparatus and method that provides a way in which the detection process with zero mean response to noise can be made to function in the presence of a frequency offset, by cancelling the progressive phase rotation.

It is still a further object of the invention to provide such apparatus and method that can perform resolution of multipath components.

These objects among others are, according to a first aspect of the present invention, attained by a method for detecting a message in a signal, wherein said message begins with a preamble consisting of a fixed sequence of symbols, each having a symbol time T, modulated by repetitions of a higher rate code having low autocorrelation at lags anything other than zero, wherein said repetitive code and said fixed sequence of symbols is known at said detector. The method comprises the steps of correlating the signal with the repetitive code; autocorrelating the signal with a copy of the signal, which is delayed substantially a symbol time; correlating the signal with the preamble; and indicating the detection of a message if a value in said signal is greater than a threshold value.

The above objects among others are, according to a second aspect of the present invention, attained by an apparatus for detecting a message in a signal, wherein said message begins with a preamble consisting of a fixed sequence of symbols, each having a symbol time T, modulated by repetitions of a higher rate code having low autocorrelation at lags anything other than zero, wherein said repetitive code is known at said detector and said fixed sequence of symbols is known at said detector. The apparatus comprises a first correlater arranged to correlate the signal with said repetitive code, an autocorrelator arranged to autocorrelate the signal with a copy of the signal, which is delayed substantially a symbol time, a second correlator arranged to correlate the signal with the known preamble, and wherein the apparatus is arranged to indicate the detection of a message if a value in said signal is greater than a threshold value.

The invention takes advantage of the repetitive nature of the signal, and the low autocorrelation of the transmitted waveform: since the transmitted signal is a sequence of positive and negative copies of an identical waveform, the received sequence also consists of a repeated waveform, but dispersed by multipath and with a phase rotation due to frequency offset. The low autocorrelation of the Barker sequence means that adjacent symbols have low interference with one another, making the approximation hold regardless of the sign of the transmitted pulses.

This duplication in time means that previous transmitted symbols can be used as "templates" by which to measure the present symbol, by autocorrelating the signal with a copy delayed by exactly one symbol period. A received signal pulse with multipath due to a BPSK symbol $b(s) \in \{-1,+1\}$, $\omega_o$ and with frequency offset can be expressed as:

$$y(n) = b(s)\exp(i\omega_o n)\sum_m A_m \exp(i\phi_m)x(n-m_s) + e(n)$$

Assuming that the interference between adjacent multipaths is small due to the low autocorrelation of the Barker sequence, the output of the correlator can be approximated by:

$$c(n) \approx b(s)\exp(i[\omega_o n - \phi])\sum_m 11 A_m \exp(i\phi_m)\partial(n-m_s) + \sum_{k=0}^{10} e(n-k)$$

where $\phi$ is the phase shift through the Barker correlator, and the digital Dirac function $\partial(k)$ is defined as being 1 when $k=0$ and zero otherwise, and is used to define the sample position of each multipath ray. This approximation holds when the magnitude of each multipath response $11A_m$ is larger than the interference from other multipath rays, i.e. around the peak.

The peak result of a symbol spaced autocorrelation between symbol s and the complex conjugate of symbol s−1, neglecting noise, can then be written as:

$$a(s) \approx b(s)b(s-1)\exp(i\omega_o T)\sum_m 11A_m\exp(i\phi_m)11A_m\exp(-i\phi_m) \quad (1)$$

$$= b(s)b(s-1)\exp(i\omega_o T)\sum_m 121 A_m^2$$

It can be seen that the result consists of the sum of the energy of all of the multipath components, with a phase rotation caused by the frequency offset over a single symbol period, with the sign of the whole expression determined by the signs of the two BPSK symbols b(s) and b(s−1).

According to a preferred embodiment of the invention, the method or apparatus is arranged to receive the signal as a first signal, and wherein the first correlation is performed by correlating the first signal with the repetitive code to form a second signal. The autocorrelation is performed by autocorrelating the second signal with a copy of the second signal, which is delayed substantially a symbol time thereby forming a third signal. The second correlation is performed by correlating the third signal with said preamble to form a fourth signal, and the indication is performed by indicating the detection of a message if a value in said fourth signal is greater than a threshold value.

According to a preferred embodiment of the invention the first, second, third and fourth signals are represented by respective first, second, third and fourth streams y, c, x and d of data respectively, and where y(n), c(n), x(n) and d(n) each represent a respective signal value at time n.

According to a preferred embodiment of the invention the third signal is correlated with said preamble by adding values taken from the third signal, where said values are spaced apart from each other with said symbol time T, to form said fourth signal.

According to a preferred embodiment of the invention the second data stream is autocorrelated by for each data item c(n) the in the second stream of data, autocorrelate a first of the data items c(n) with a second of the data items c(n−T) delayed with said symbol time T, thus construing said third data stream of autocorrelated data items x(n), and the third signal is correlated with the preamble by multiplying each data item $x(n_1)$, $x(n_1-T)$, $x(n_1-2*T)$ ... $x(n_1-S*T)$ in a sub-set of the third data stream x(n) for a required number of symbols S in said preamble with the BPSK value b(s) for the corresponding symbol and the previous symbol and adding each of said multiplied data items to form said fourth data stream d(n).

According to a preferred embodiment of the invention the message is any one of a plurality of messages each having a specific preamble. The third data stream is correlated with the preamble for each message forming a fourth data stream for each correlation having values $d_i(n)$, where i represents a fourth data stream, and the detection of a specific message is indicated by comparing the values $d_i(n)$ for each of said fourths data streams with a respective threshold and indicating a detection of said any one message if said value $d_i(n)$ is above said respective threshold.

In for instance IEEE 802.11b it is possible to send messages in two different formats separated by different preambles. These messages need to be separated during the detection of the preamble and therefore two parallel detections may be implemented.

According to a preferred embodiment of the invention k data items x(n−k) from said third data stream x(n) is multiplied by a window function w(k) and added to perform a window operation.

According to a preferred embodiment of the invention said autocorrelation is performed by for a plurality of k data items c(n) multiplying the complex value c(n−k) with the complex conjugate c*(n−k−T) and with a window function w(k) and summing said multiplied values.

The window function sums the contribution from different multipath components.

In practice, the number of multipath components is not known in advance and a typical implementation will simply sum over a fixed delay window. The duration of this window should be chosen to match the expected length of the multipath dispersion, and a window function w(k) can be used to better match the expected mulipath amplitude profile: these measures give the best rejection of noise. The autocorrelation function, calculated on the Barker correlator output c(n), is then given by:

$$a(n) = \sum_{k=0}^{k} w(k)c(n-k)c*(n-k-T)$$

The complex conjugate operation, denoted by the asterisk, can be equally well applied to the non-delayed version of the symbol instead. Also it is possible to simplify the implementation at the expense of performance by choosing a constant value for the window function and by using a reduced resolution for the input data into the complex multiplication, e.g. slicing one input to +/−1 +/−i, that is, forcing the continuous input to the closest value from a set of selected values.

The symbol-spaced peaks of this autocorrelation consist of a constant phase component multiplied by the product of the signs of the BPSK inputs b(s) and b(s−1). These values are in the fixed preamble sequence, and so the required number of peaks can be added together with the signs adjusted, giving an output the maximum amplitude of which can be used to provide the detection decision.

According to a preferred embodiment of the invention the second signal is averaged or summed over N symbols, where N is greater than 2, to reduce noise.

According to another preferred embodiment of the invention, correlating said signal with said preamble comprises multiplying data items c(n) at symbol spaced times in said second stream of data with the BPSK value of the corresponding symbol; adding M, where M is greater than 1, of said multiplied symbol spaced data items c(n), c(n−T), c(n−2*T), . . . , c(n−(M−1)*T) giving a first sum, representing a first averaged symbol value; adding L, where L is greater than 1, of said multiplied symbol spaced data items c(n−M*T), c(n−(M+1)*T), c(n−(M+2)*T), . . . , c(n−(M+L−1)*T), adjacent to said M data items, giving a second sum, representing a second averaged symbol value; wherein said autocorrelation is performed by autocorrelating said first and second averaged symbol values, and wherein the above steps of multiplying, adding and autocorrelating is repeated for a required number of symbols in said preamble.

By averaging the values used in the autocorrelation over two or more symbols, it is possible to make the method and apparatus according to the invention less sensitive to noise in the input signal. However, this will increase the number of multiplications in the process.

According to a preferred embodiment of the invention the autocorrelation is pre-calculated.

According to a preferred embodiment of the invention the following steps are performed for each value in said second data stream: adding symbol spaced values for each possible combination of BPSK values to form every combination of averaged symbol values possible for M adjacent symbols, forming a first set of averaged symbol values; adding symbol spaced values, adjacent to said M symbols, for each possible combination of BPSK values to form every combination of averaged symbol values possible for L adjacent symbols forming a second set of averaged symbol values, and wherein; said autocorrelation is performed by autocorrelating every possible combination of averaged symbol values in said first and second set of averaged symbol values, thus forming a first set of data streams; feeding each of said data stream in said set of data streams to a separate parallel delay line, and; tapping the corresponding of said delay lines at the corresponding symbol in said preamble and adding said tapped values to form said fourth data stream.

According to a preferred embodiment of the invention the number of average symbol values is reduced in said first and second set by removing values which only differ in sign, thereby reducing the number of said data streams in said set of data streams, and the sign for the corresponding symbols is corrected in the taps from the corresponding delay line.

By the arrangement above the number of multiplications, when performing averaging over symbols, can be substantially reduced and exchanged for memory space.

In the presence of only noise at the input (no signal), the result of the Barker correlation is white Gaussian noise. The result of the autocorrelation is also white and has zero mean; the subsequent symbol-spaced summation then reduces the variance of the result while keeping the zero mean, giving the maximum separation between the detector output with and without a signal.

The output of the detector is proportional to the signal level, so it is necessary to normalise the detection decision threshold according to the signal power measured during approximately the same period as the detection algorithm is performed.

The main advantage of the methods according to the invention are the increased difference in detector output between the "signal present" and "no signal" cases, gained by bringing knowledge of the transmitted BPSK sequence into the detection decision. This offers reduced probability of false alarm at a given threshold setting, or higher detection probability at a given false alarm rate. The method also provides a means of improving detection probability in the presence of multipath dispersion.

The method according to the preferred embodiment with noise reduction offers improved performance at low signal-to-noise ratios, at the expense of increased hardware complexity.

The Barker sequence has a number of non-ideal properties: sinusoidal interfering signals or DC can produce a significant correlation result. A further advantage of bringing knowledge of the transmitted BPSK sequence into the detection decision is that the correlation response to a constant sinusoid or DC signal can be to a great extent eliminated at the detector output.

Further characteristics of the invention and advantages detailed thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 6, which are given by way of illustration only, and thus are not limitative of the present invention.

PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions, of well-known methods and apparatuses are omitted so as not to obscure the description of the present invention with unnecessary details.

Figure 1:
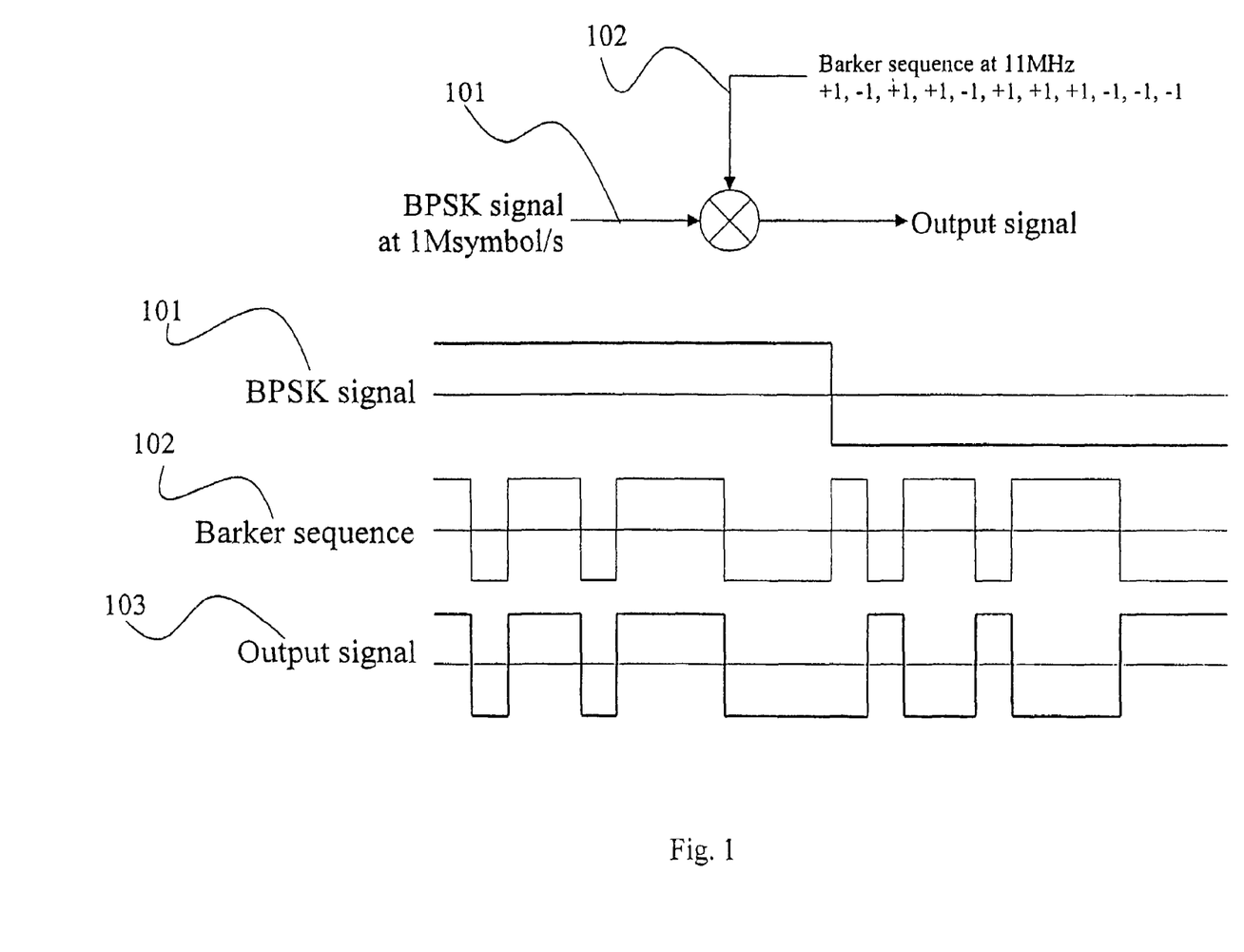
FIG. 1 shows a BPSK signal overlaid with a Barker sequence and the corresponding output signal according to known technique.

FIG. 1 schematically shows a 1 MHz BPSK signal 101 transmitted using an 11 MHz Barker code sequence 102 producing a 11 MHz output signal 103 according to known techniques.

Figure 2:
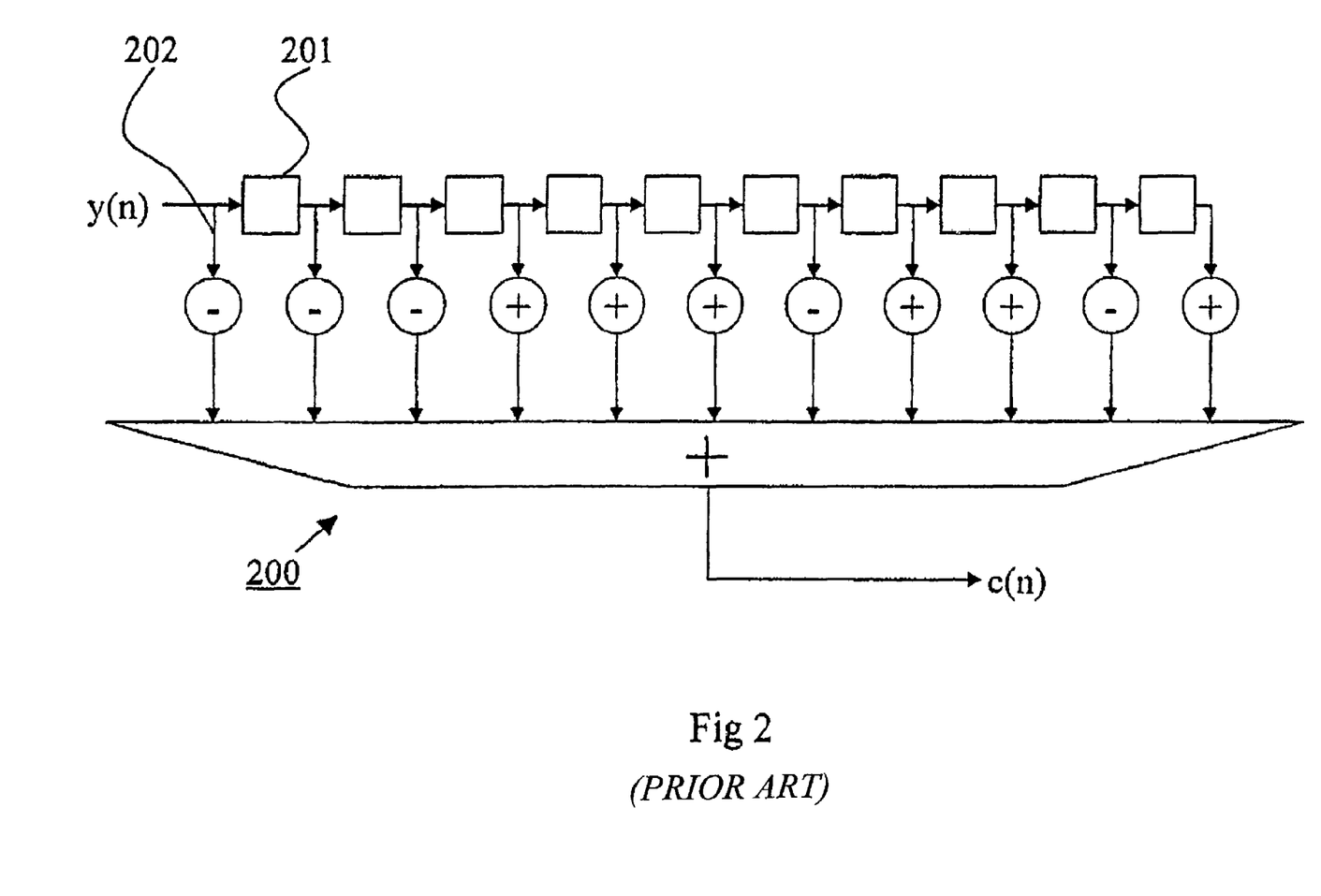
FIG. 2 shows a Barker correlater according to prior art.

The transmitted signal is received in a receiver and is correlated with the transmitted Barker sequence by a correlator 200 consisting of 11 single sample delay stages 201 and taps 202 consisting of +1/−1 to match the sequence of transmitted chips as shown in FIG. 2. Considering a transmitted sequence beginning at time, the output of the correlator is given by:

$$c(n) = \sum_{k=0}^{10} x(n-k)y(n+k) =$$

$$A\exp(i\phi)\sum_{k=0}^{10} x(n-k)x(n-m-k) + c(n) = \sum_{k=0}^{10} x(n-k)e(n-k)$$

The second term in this result is the sum of 11 samples of Gaussian noise multiplied by +1/−1. By writing n'=n−m−k and reordering the summation, the first term can be rewritten as:

$$c(n) = A\exp(i\phi)\sum_{n'=n-m-10}^{n-m} x(n')x(n'+m)$$

As can be seen, this resembles the autocorrelation expression: the only difference is that the summation range is limited to 11 samples. Since the Barker sequence is zero except when 0≦n≦10, the maximum occurs when m=n−10, i.e. 10 samples after the transmission began.

In terms of the correlator circuit in FIG. 2, this corresponds to an entire symbol of data being clocked into the delay line: only at this point do all of the +1/−1 taps 202 align with the data, causing a pulse at the output.

Figure 3:
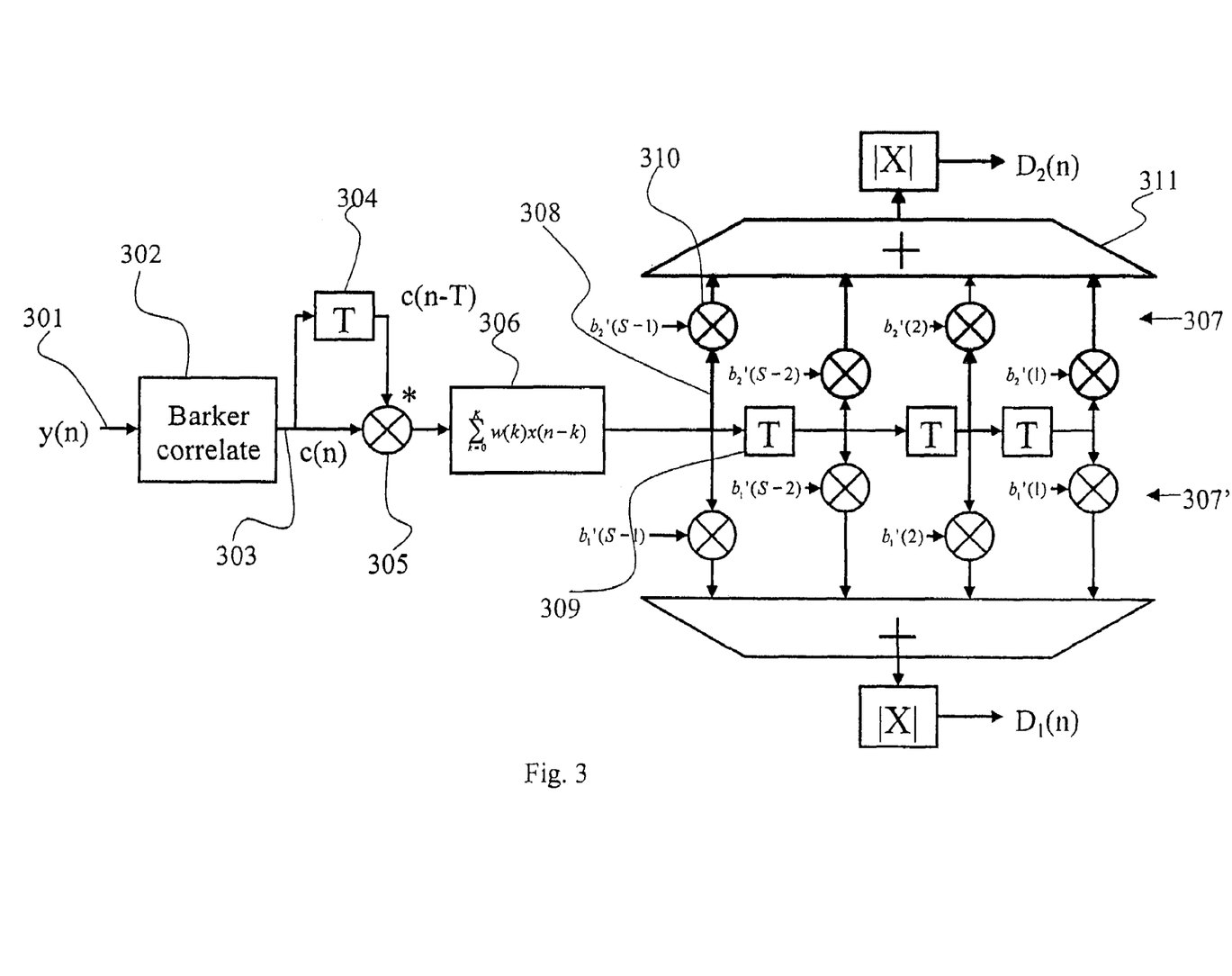
FIG. 3 is a preferred embodiment according to the invention wherein two parallel preamble correlators are implemented. It should be noted that the invention also works with one preamble correlator.

A preferred embodiment according to the invention is shown in FIG. 3. This embodiment is designed to receive Barker code messages in IEEE 802.11b format. It should however be clear that the invention also is applicable to other transmission protocols and is not limited to IEEE 802.11b. For the case of 802.11b, where there are two possible BPSK sequences used, the two corresponding detector outputs $D_1$ and $D_2$ are compared with the normalised decision threshold, or thresholds, since different thresholds can be used for the two different preamble types. Detection is indicated if either $D_1$ or $D_2$ is greater. In non-802.11b systems, where only a single preamble sequence is permitted, only one output need be used thereby giving an improved false alarm performance.

It is also possible to produce a number of equivalent structures through retiming, where the autocorrelation operation, or even the Barker correlation, is moved to the taps of the delay line. Such a solution will however increase the necessary hardware.

With reference to FIG. 3, in more detail, a signal consisting of a stream of data y(n) 301 is received and Barker correlated 302 according to the structure shown in FIG. 2, whereby a correlated second stream of data c(n) 303 is achieved. A copy of the data stream is delayed one symbol time in a delay function 304, complex conjugated and multiplied with the original signal stream in multiplier 305 to construe a third data stream x(n). A window function 306 is applied to the data stream x(n) to add up multipath components and the created data stream is then fed into a delay-and-tap function 307.

The delay-and-tap function 307 taps the data stream x(n) with symbol times distances. That is, the delay-and-tap function 307 comprises a first tap 308, and a first delay function 309, which delays the data stream x(n) a symbol time T, for each and as many symbols as is required to achieve a reliable detection. This arrangement has the effect of tapping the data stream x(n) at symbol times thereby collecting the symbol data values at each tap.

Each of the taps 308 are then multiplied 308 with the corresponding BPSK sign for the particular symbol tapped and the BPSK sign of the symbol preceding the tapped symbol according to equation 1 above, to correct the sign of the tapped value. That is, b'(s)=b(s)b(s−1). The tapped sign-corrected values are then added in an adder 311. The absolute value is calculated and the stream of values D(n), one for each y(n), is output. This value may then be compared to a threshold to detect the presence of a message.

In the present embodiment the detector in FIG. 3 is adopted to recognize 802.11b messages, which may have two different preambles. Therefore the delay-and-tap function 307 is duplicated 307', with the duplicated delay-and-tap function 307' having a different set of BPSK values in the duplicated branch.

Thus, each symbol is autocorrelated to the previous, adjacent symbol with the signs from the BPSK corrected.

The method described in connection with FIG. 2 may be sensitive to noise. If the noise level is too high, the structure of the periodic signal is lost and it is not possible to resolve the multipath. In this case, autocorrelation process only contributes noise to the detection result, and the phase of the resulting signal can also become scrambled. Also, in systems where AGC (Automatic Gain Control) is employed it may be the case that a large portion of a single symbol period is "blanked" to zero during switching of the receiver gain.

In order to improve the performance of the design, averaging of adjacent symbols can be used to reduce the noise level.

Due to frequency offset, there is a phase rotation between the correlator output at each symbol; however, this does not significantly reduce the output of each of the two summations as long as the total accumulated phase shift is small. The point at which the phase rotation significantly affects the magnitude of the summation result limits the number of symbols that can be summed together, if the latency introduced by the process does not.

Mathematically, the output of the autocorrelation with L and M symbols summed on each arm of the autocorrelation is given by:

$$a(s,n) = \sum_{k=0}^{K} w(k)\left(\sum_{l=0}^{L-1} b(s-1)c(n-lT-k)\right)\left(\sum_{m=L}^{M+L-1} b(s-m)c(n-mT-k)\right)$$

These "averaged autocorrelations" can then be used to produce the overall result according to:

$$d(n) = \sum_{s=M+L-1}^{S-1} a(s,n)$$

and the magnitude of this result can then be compared with a threshold that has been normalised by the mean signal power.

The final summation reduces the noise variance of the result compared to the signal component. As in the embodiment in FIG. 2, the result has a zero mean in the absence of a signal.

Figure 4:
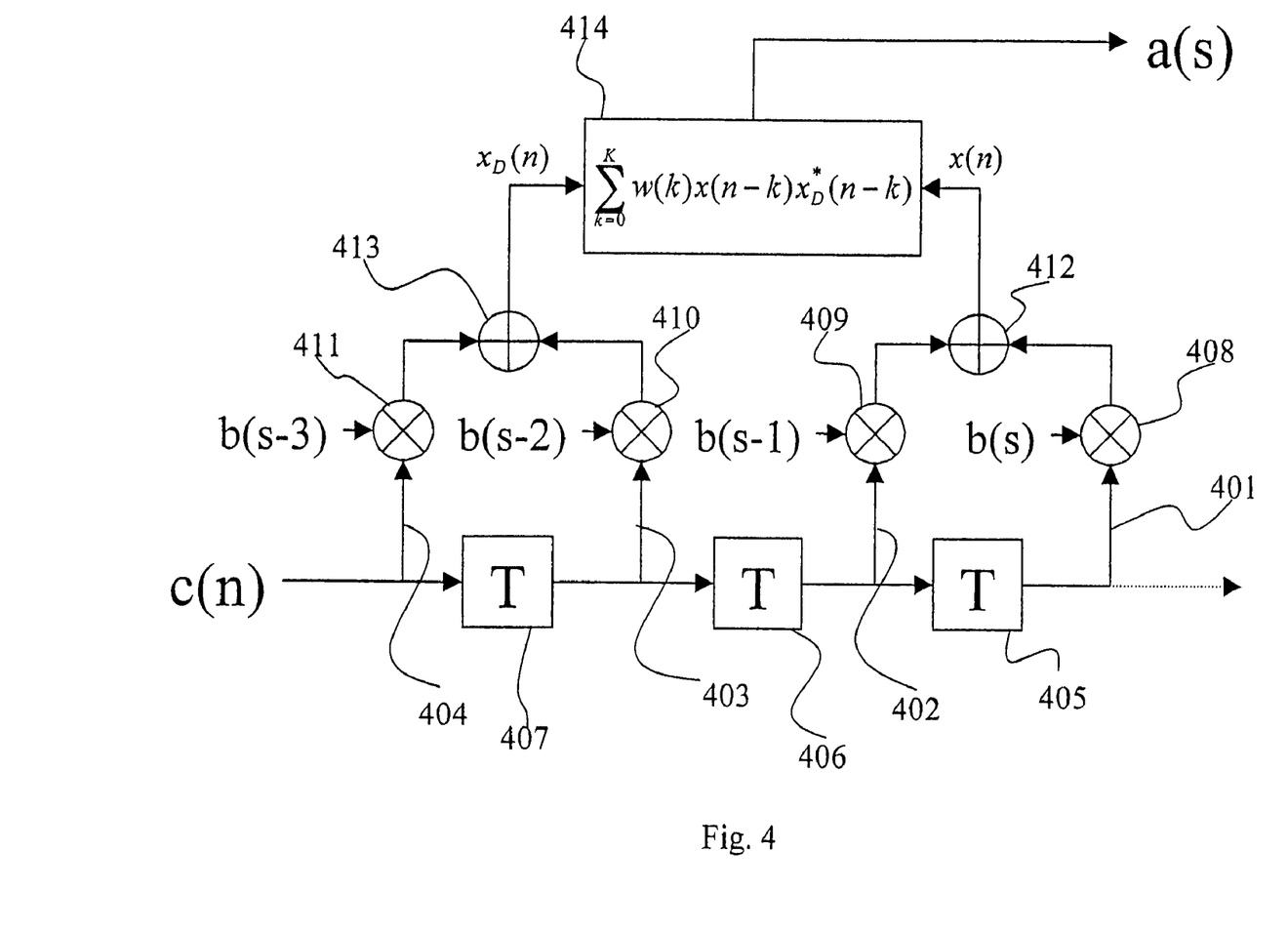
FIG. 4 is a preferred embodiment according to the invention where symbols are averaged together before autocorrelation.

FIG. 4 shows schematically such a structure averaging over two symbols in each arm. It should be clear however that more than two symbols could be used to form the average. A stream of data c(n) is received from a Barker correlator (not shown). The stream is tapped four times, by first, second, third and fourth taps, denoted 401, 402, 403 and 404, respectively, spaced apart with the symbol time through delays 405, 406 and 407. The BPSK signs for the corresponding tap are multiplied in first, second, third and fourth multipliers denoted 408, 409, 410 and 411, respectively. That is, data from the tap 401 is multiplied with the BPSK value for symbol s and data from the tap 402 is multiplied with the BPSK value for symbol s−1. Then the two values are added in an adder 412 to form the data stream x(n). Likewise, data from the tap 403 is multiplied with the BPSK value for the symbol s−2 and data from the tap 404 is multiplied with the BPSK value for the symbol s−3. They are then added in an adder 413 to form the data stream $X_D(n)$. Since no average is actually calculated the corresponding threshold need to be properly adjusted.

The stream x(n) is then multiplied with the complex conjugate of $X_D(n)$ and windowed in a window function 414 to add multipath components. The output from the window function 414 thus represents an averaged autocorrelated symbol value. The structure is then repeated for every symbol in the delay line. That is, for each additional symbol used in the detector according to the invention a copy of the structure disclosed in FIG. 4 must be used.

A direct implementation with the structure according to the above repeated for each tap of the summation is expensive in terms of the number of multipliers required. It is possible to trade the number of multipliers against additional storage elements. The principle is to precalculate the value of a(s,n) for all of the possible BPSK symbols b(s), b(s−1), b(s−2) and b(s−3) in the calculation. For example, in the case where two symbols are averaged in each arm of the autocorrelation, the possible values of b(s) and b(s−1) in each pair are {+1,+1}, {+1,−1}, {−1,+1} and {−1,−1}. By taking advantage of the fact that two of the possible pairs are simply a multiple −1 times the other two pairs, it is only necessary to calculate the result for four of the eight combinations, e.g. {+1,+1; +1,+1}; {+1,+1; +1,−1}; {+1,−1; +1,−1}; and {+1,−1; +1+1}. All other combinations can be derived by simply reversing the sign of the results. It should be clear that more than two symbols can be used for averaging, and similar calculations may be performed if more than two symbols is preferred.

This optimisation is, however, of most interest when the number of symbols being averaged together per autocorrelation are small and both arms of the autocorrelation use an equal number of symbols. Otherwise, the number of storage elements required holding all possible sequences are excessive.

Figure 5:
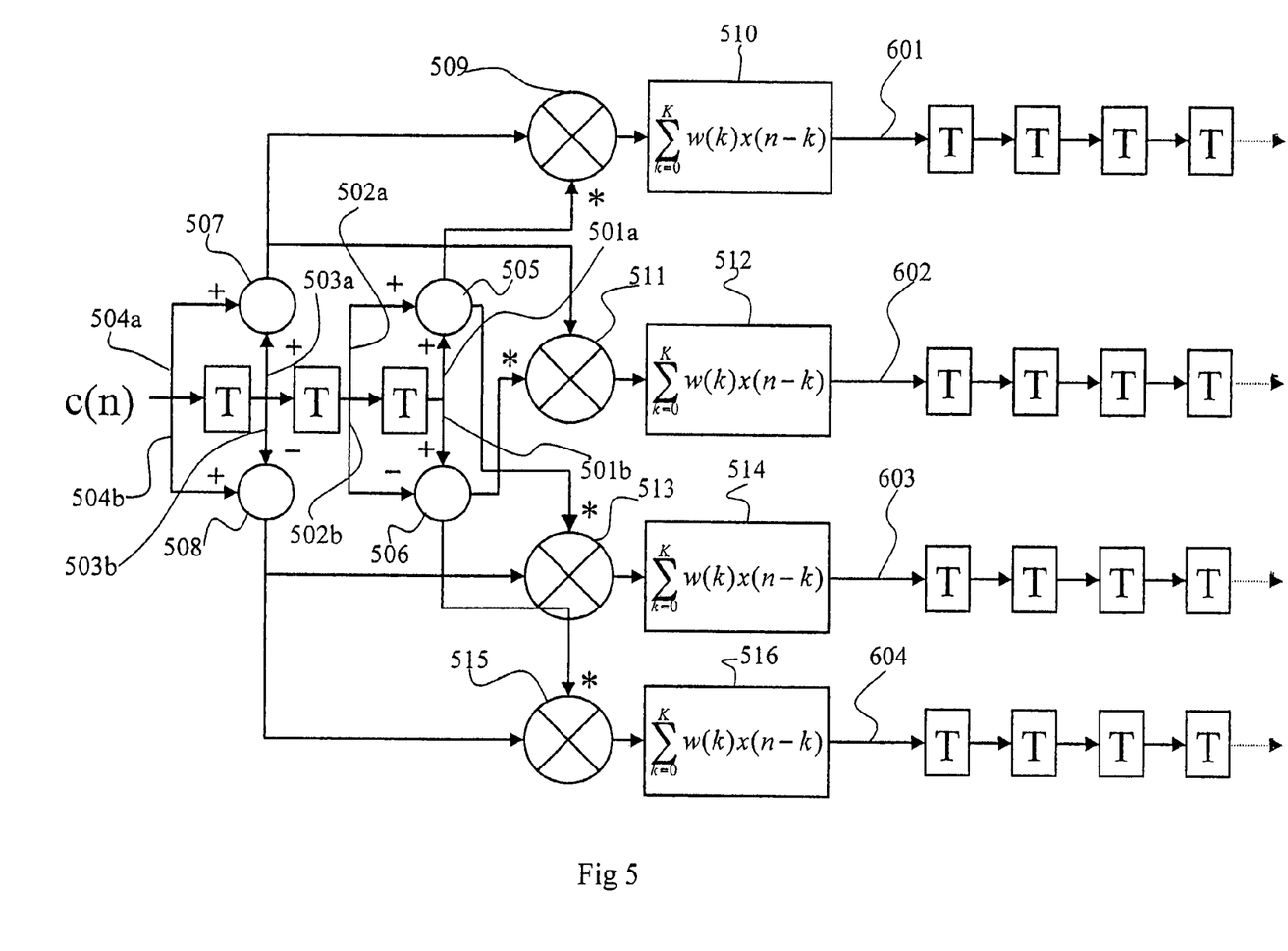
FIGS. 5 and 6 are a preferred embodiment according to the invention where the autocorrelation is pre-calculated.
Figure 6:
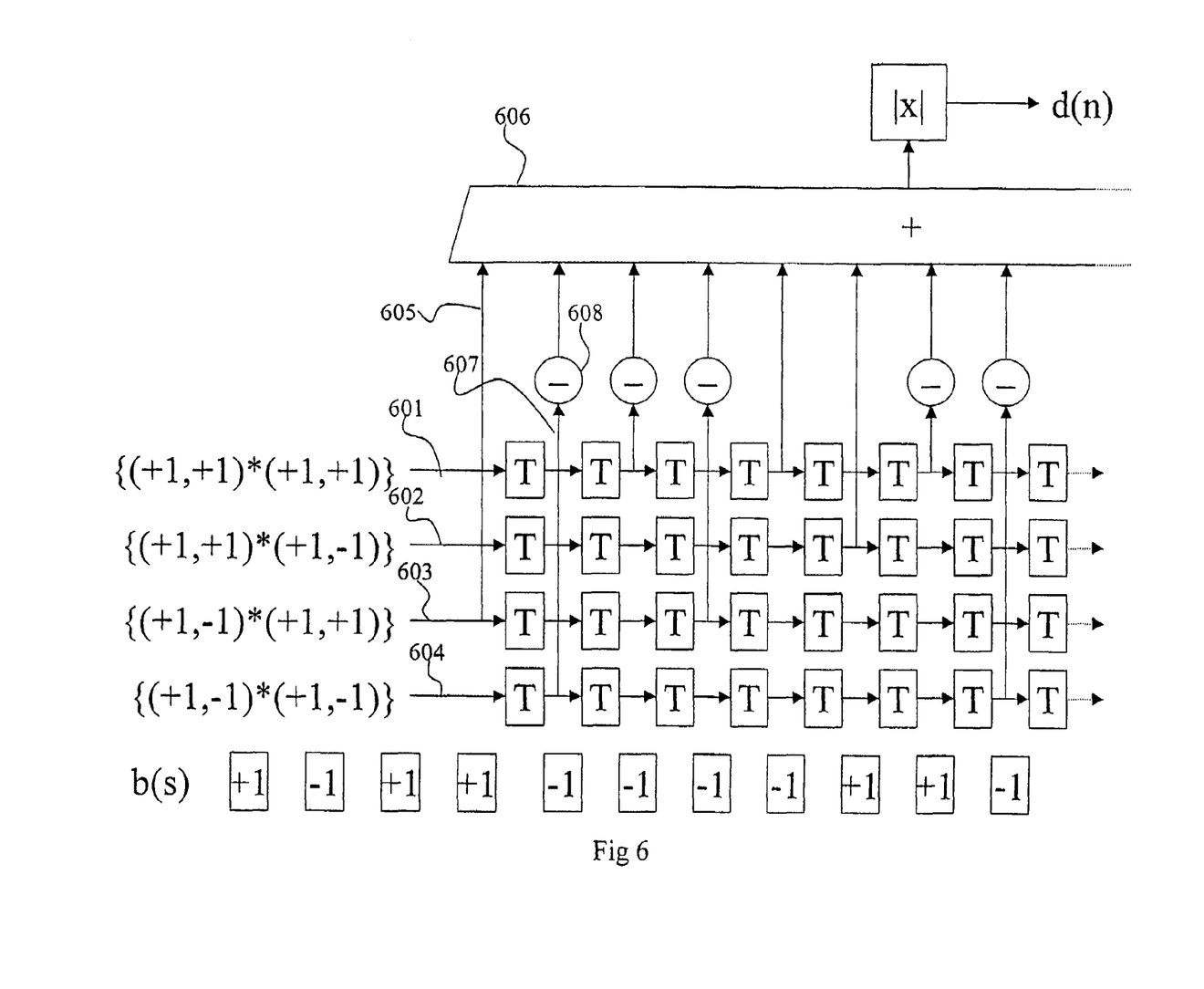

FIGS. 5 and 6 schematically disclose an implementation taking advantage of the above averaging over two symbols in each arm.

A stream of data c(n) is received from a Barker correlator (not shown), and fed to a delay line where the data stream is tapped with symbol time distance. Eight taps, denoted 501a, 501b, 502a, 502b, 503a, 503b, 504a and 504b, are fed to first, second, third and fourth adder 505, 506, 507 and 508, respectively. That is, the tap 501a and the tap 502a are fed to the first adder 505, which adds them with positive sign.

The tap 503a and the tap 504a are fed to the third adder 507, which adds them with positive sign. The tap 501b and the tap 502b are fed to the second adder 506, which add them with a negative sign for the tap 502b. And finally, the tap 503b and the tap 504b are fed to the fourth adder 508, which adds them with a negative sign for the tap 503b.

The output from the third adder 507 and the first adder 505 is fed to a first multiplier 509, which multiplies the complex conjugate of the delayed symbol with the non-delayed symbol. The output from the first multiplier 509 is fed to a first window function 510, which output is further fed to a first delay line 601 in FIG. 6. The output from the first multiplier 509 represents the BPSK values {+1,+1;+1,+1}.

The output from the third adder 507 and the second adder 506 is fed to a second multiplier 511, which multiplies the complex conjugate of the delayed symbol with the non-delayed symbol. The output from the second multiplier 511 is fed to a second window function 512, which output is further fed to a second delay line 602 in FIG. 6. The output from the second multiplier 511 represents the BPSK values {+1,+1;+1,−1}.

The output from the first adder 505 and the second adder 506 is fed to a third multiplier 513, which multiplies the complex conjugate of the delayed symbol with the non-delayed symbol. The output from the third multiplier 512 is fed to a third window function 514, which output is further fed to a third delay line 603 in FIG. 6. The output from the third multiplier 513 represents the BPSK values {+1,−1;+1,+1}.

Finally, the output from the fourth adder 508 and the second adder 506 is fed to a fourth multiplier 515, which multiplies the complex conjugate of the delayed symbol with the non-delayed symbol. The output from the fourth multiplier 515 is fed to a fourth window function 516, which output is further fed to a fourth delay line 604 in FIG. 6. The output from the fourth multiplier 515 represents the BPSK values {+1,−1; +1,−1}.

Thus four parallel data streams is construed each representing a different set of BPSK values.

The detector in FIGS. 5 and 6 is arranged to detect a preamble, which consists, at least partially, of the data stream {+1,−1,+1,+1,−1,−1,−1,−1,+1,−1}. It should be clear that this is only an exemplary preamble and in a real world detector the preamble, to detect, is probably considerably longer. When this preamble appears on the data stream c(n) the detector will output d(n) a maximum value, which is compared to a threshold and the detector indicates the presence of a message on the transmission medium.

The first four BPSK values in the preamble to detect is {+1,−1,+1,+1}, which corresponds to the third delay line 603 and so this line is tapped, by a first tap 605 and fed to an adder 606. The next four BPSK values is {−1,+1,+1,−1}, which corresponds to the fourth delay line 604 with a reversed sign for the first pair of BPSK values. Thus, the fourth delay line is tapped, by a second tap 607 and the sign is reversed, in a multiplier 608 and fed to the adder 606. The next four BPSK values used in the averaging and autocorrelation is {+1,+1,−1,−1}, which corresponds to the first delay line with a reversed sign for the second pair of BPSK values. Thus, the first delay line 601 is tapped after two symbol time delays, the sign reversed, and the result fed to the adder 606. The next four BPSK values is {+1,−1,−1,−1} corresponding to the third delay line 603 with a reversed sign for the second pair. The following four BPSK values is {−1,−1,−1,−1} corresponding to the first delay line 601 with the sign reversed for both pair of BPSK values. Since both pairs have a reversed sign no sign change is necessary for the tapped value ((−1)*(−1)=1). The above continues for as many symbols as is necessary to detect in the preamble.

With the above arrangement the number of multipliers required has been significantly reduced.

It will be obvious that the invention may be varied in a plurality of ways. Such variations are not to be regarded as a departure from the scope of the invention. All such modifications as would be obvious to one skilled in the art are intended to be included within the scope of the appended claims.

I claim:

1. A method for detecting a message in a signal, wherein said message begins with a preamble consisting of a fixed sequence of symbols, each having a symbol time T, modulated by repetitions of a higher rate code having low autocorrelation at lags anything other than zero, wherein said repetitive code and said fixed sequence of symbols are known at said detector, comprising the steps of:
   receiving said signal as a first signal,
   correlating said first signal with said repetitive code to form a second signal,
   autocorrelating said second signal with a copy of said second signal which is delayed substantially a symbol time to form a third signal,
   correlating said third signal with said preamble to form a fourth signal, and
   indicating the detection of a message if a value in said fourth signal is greater than a threshold value.

2. The method according to claim 1, wherein said first, second, third and fourth signals are represented by respective first, second, third and fourth streams of data respectively, and where $y(n)$, $c(n)$, $x(n)$ and $d(n)$ each represent a respective signal value at time n.

3. The method according to claim 1, comprising the step of:
   correlating said third signal with said preamble by adding values taken from said third signal, where said values is spaced apart from each other with said symbol time T, to form said fourth signal.

4. The method according to claim 2, comprising the steps of:
   autocorrelating said second data stream for each data item $c(n)$ in said second stream of data, autocorrelate a first of said data items $c(n)$ with a second of said data items $c(n-T)$ delayed with said symbol time T, thus construing said third data stream of autocorrelated data items $x(n)$,
   correlating said third signal with said preamble by multiplying each data item $x(n_1)$, $x(n_1-T)$, $x(n_1-2*T)$, $x(n_1-2*T) \ldots x(n_1-S*T)$ in a sub-set of said data stream $x(n)$ for a required number of symbols S in said preamble with the BPSK value b(s) for the corresponding symbol and the previous symbol and adding each of said multiplied data items to form said fourth data stream $d(n)$.

5. The method according to claim 2, wherein said message is any one of a plurality of messages each having a specific preamble and comprising the steps of:
   correlating said third data stream with the preamble for each message forming a fourth data stream for each correlation having values $d_i(n)$, where i represents a fourth data stream, and
   indicating the detection of a specific message by comparing the values $d_i(n)$ for each of said fourths data streams with a respective threshold and indicating a detection of said any one message if said value $d_i(n)$ is above said respective threshold.

6. The method according to claim 2, wherein the value $c(n)$ is complex and said autocorrelation is performed by multiplying the complex value $c(n)$ with a delayed complex conjugate value $c^*(n-T)$.

7. The method according to claim 2, wherein k data items $x(n-k)$ from said third data stream $x(n)$ is multiplied by a window function $w(k)$ and added to perform a window operation.

8. The method according to claim 2, wherein said autocorrelation is performed by for a plurality of k data items $c(n)$ multiplying the complex value $c(n-k)$ with the complex conjugate $c^*(n-k-T)$ and with a window function $w(k)$ and summing said multiplied values.

9. The method according to claim 2, comprising the step of:
   averaging or summing the second signal over N symbols, where N is greater than 2, to reduce noise.

10. The method according to claim 2, wherein correlating said third signal with said preamble to form a fourth signal comprises the steps of:
    multiplying data items $c(n)$ at symbol spaced times in said second stream of data with the BPSK value of the corresponding symbol,
    adding M, where M is greater than 1, of said multiplied symbol spaced data items $c(n)$, $c(n-T)$, $c(n-2*T)$, ..., $c(n-(M-1)*T)$ giving a first sum, representing a first averaged symbol value,
    adding L, where L is greater than 1, of said multiplied symbol spaced data items, $c(n-M*T)$, $c(n-(M+1)*T)$, ..., $c(n-(M+L-1)*T)$, adjacent to said M data items, giving a second sum, representing a second averaged symbol value,
    wherein said autocorrelation is performed by multiplying one averaged symbol value with the complex conjugate of the other averaged symbol value and summing the result over k data items each multiplied by a window function $w(k)$, and wherein
    the above steps of multiplying, adding and autocorrelating are repeated for a required number of symbols in said preamble.

11. The method according to claim 1, wherein said autocorrelation is pre-calculated.

12. The method according to claim 9, comprising the additional step of that for each value in said second data stream performing the steps of:
    adding symbol spaced values for each possible combination of BPSK values to form every combination of averaged symbol values possible for M adjacent symbols, forming a first set of averaged symbol values
    adding symbol spaced values, adjacent to said M symbols, for each possible combination of BPSK values to form every combination of averaged symbol values possible for L adjacent symbols forming a second set of averaged symbol values, and wherein
    said autocorrelation is performed by autocorrelating every possible combination of averaged symbol values in said first and second set of averaged symbol values, thus forming a first set of data streams,
    feeding each of said data stream in said set of data streams to a separate parallel delay line, and
    tapping the corresponding of said delay lines at the corresponding symbol in said preamble and adding said tapped values to form said fourth data stream.

13. The method according to claim 12, comprising the step of:
    reducing the number of average symbol values in said first and second set by removing values which only differ in sign, thereby reducing the number of said data streams in said set of data streams, and
    correcting the sign for the corresponding symbols in said taps from the corresponding delay line.

14. The method according to claim 1, wherein said message is a message according to the standard IEEE 802.11.

15. An apparatus for detecting a message in a signal, wherein said message begins with a preamble consisting of a fixed sequence of symbols, each having a symbol time T, modulated by repetitions of a higher rate code having low autocorrelation at lags anything other than zero, wherein said repetitive code is known at said detector and said fixed sequence of symbols is known at said detector, comprising
- a first correlater to be arranged to correlate said signal with said repetitive code,
- an autocorrelator to be arranged to autocorrelate said signal with a copy of said signal, which is delayed substantially a symbol time,
- a second correlator to be arranged to correlate said signal with said preamble, and wherein
- said apparatus is arranged to indicate the detection of a message if a value in said signal is greater than a threshold value.

16. The apparatus according to claim 15, wherein
- said signal is provided to be represented by a first data stream supplied to said first correlater, which produces a second correlated data stream,
- said second data stream is provided to be supplied to said autocorrelator, which produces a third data stream,
- said third data stream is provided to be supplied to said second correlator, which produces a fourth data stream, and
- said indication of detection of a message is provided to be done if a value in said fourth data stream is above said threshold value.

* * * * *